United States Patent [19]

Boehmer et al.

[11] Patent Number: 4,924,923
[45] Date of Patent: May 15, 1990

[54] FUEL FILLER PIPE SEAL

[75] Inventors: Dennis A. Boehmer, Xenia, Ohio; James W. Williams, Okemos, Mich.

[73] Assignee: Vernay Laboratories, Inc., Yellow Springs, Ohio

[21] Appl. No.: 353,272

[22] Filed: May 17, 1989

[51] Int. Cl.$^5$ .................... B65B 39/02; B60K 15/04
[52] U.S. Cl. ........................... 141/312; 277/212 FB; 277/157; 220/85 F; 220/86 R; 141/350
[58] Field of Search ............... 141/312, 301, 285, 350, 141/392; 220/85 R, 85 US, 85 VR, 85 F, 86 R; 277/212 FB, 178, 157

[56] References Cited

U.S. PATENT DOCUMENTS

| | | | |
|---|---|---|---|
| 2,576,192 | 11/1951 | Poznik | 220/86 R |
| 2,675,823 | 4/1954 | Langdon | 220/86 R |
| 3,478,922 | 11/1969 | Mole | 220/86 R |
| 3,734,149 | 5/1973 | Hansel | 141/350 |
| 3,903,942 | 9/1975 | Vest | 141/301 |
| 4,037,754 | 7/1977 | Wilhelmi et al. | 220/85 FX |
| 4,323,166 | 4/1982 | Maeroff | 220/86 R |
| 4,501,374 | 2/1985 | Robertson | 220/86 R |
| 4,702,386 | 10/1987 | Boehmer et al. | 220/86 R |
| 4,760,933 | 8/1988 | Christner et al. | 220/86 R |
| 4,822,054 | 4/1989 | Christner et al. | 220/86 R X |

Primary Examiner—Ernest G. Cusick
Attorney, Agent, or Firm—Biebel, French & Nauman

[57] ABSTRACT

A combination seal and check valve to be mounted in a filler pipe of a fuel tank to minimize the escape of vapor from the tank when its cap is removed, typically during refueling, comprises an annular body of elastomeric material which includes an internal annular lip for sealing around the outer surface of a fuel nozzle, and an integral check valve portion at the axially inner end thereof. This check valve portion includes at least three gusset members which are of such configuration and proportions that when a fuel nozzle is inserted through the unit, the gusset members are deflected radially outwardly to open a passage through the check valve without being stretched or otherwise distorted by passage of the fuel nozzle therepast.

7 Claims, 2 Drawing Sheets

U.S. Patent    May 15, 1990    Sheet 1 of 2    4,924,923
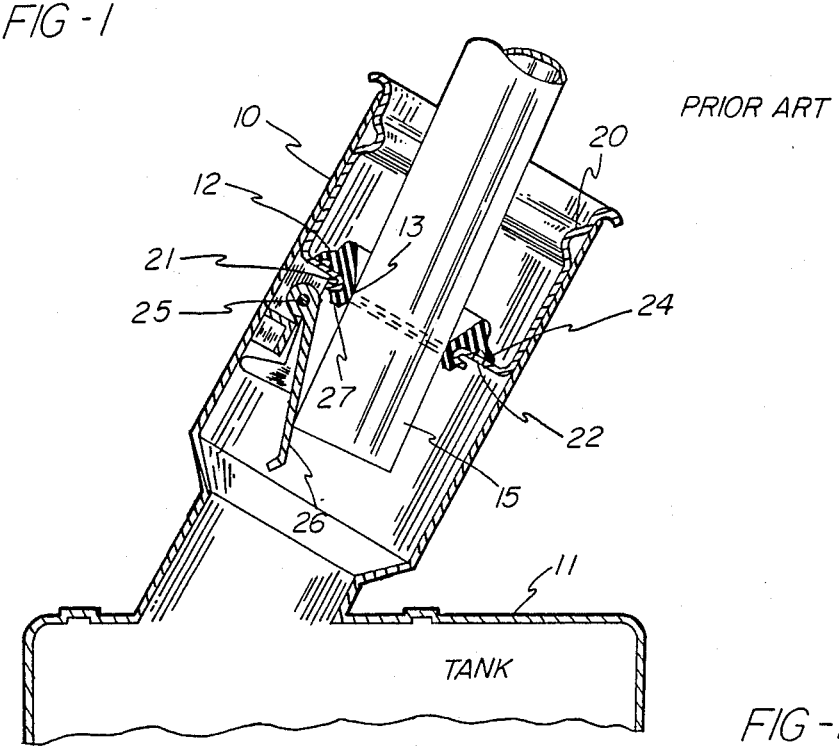
FIG-1    PRIOR ART
FIG-2
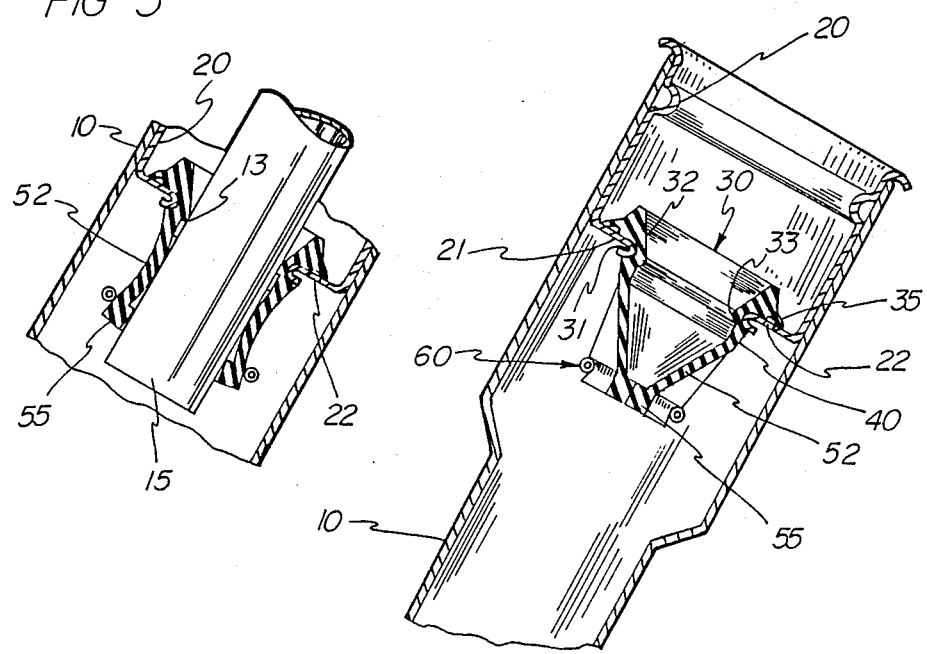
FIG-3

FUEL FILLER PIPE SEAL

BACKGROUND OF THE INVENTION

In refilling the fuel tank of a motor vehicle with liquid fuel, usually gasoline, a fuel nozzle is inserted into the filler pipe leading to the fuel tank, and the liquid fuel is discharged through this nozzle and the filler pipe into the tank. The operator may hold the nozzle valve open manually, or the valve may be held open mechanically, but in either case, the nozzle usually incorporates an automatic shut-off device which effects closing of the nozzle when the fuel in the tank reaches a certain level.

Typically in such refueling operations, since the fuel is volatile, a portion will evaporate, and the resulting fumes can escape into the atmosphere through the space between the outer surface of the nozzle and the inner surface of the filler pipe, as well as through the filler pipe while its cap is removed but the nozzle is not in the pipe. Minimizing of the resultant pollution of the surrounding atmosphere, as well as of the potential of explosion, has been the subject of research and development for some years.

For example, Vest U.S. Pat. No. 3,903,942 proposed that the filler tube for a vehicle fuel tank be provided at its outer end with a tubular "adapter member" of elastomeric material, e.g. neoprene. This tubular member has a normally constricted inner end so that as the fuel nozzle is inserted from the outer end, the inner end of the adapter member will expand to engage the outer surface of the nozzle and at the same time to seal whatever space would otherwise exist between the nozzle and the filler pipe. As another example, Maeroff U.S. Pat. No. 4,323,166 discloses a seal of elastomeric material for a fuel tank which has a filler opening without a filler pipe. This seal comprises a tubular body having an axially outer portion which forms a seal with the nozzle, and a tubular extension which depends into the tank.

A practical difficulty which affects prior art seals of the type described above is that they are subject to damage by the forced entry of a fuel nozzle, particularly when they are relatively-stiff as a result of cold weather. The damage may occur in the form of undue elongation tending to pull the seal away from its mounting or tearing. Also, if the nozzle is not in the proper position with respect to the seal, the automatic shut-off valve in the nozzle may be prevented from properly sensing the liquid level in the tank and thereby be rendered inoperative.

SUMMARY OF THE INVENTION

The primary purpose of the present invention is to provide a one-piece fuel filler pipe seal of elastomeric material which includes an integral check valve portion for minimizing the escape of fumes from within a fuel tank and which avoids the problems of the prior art as summarized above.

More specifically, the invention provides a combined seal and check valve to be mounted in the filler pipe of a fuel tank in the form of an annular body of elastomeric material including an axially outer end portion having its radially outer surface configured for mounting in sealing engagement with the outer end of the filler pipe, and its radially inner surface proportioned to receive therethrough and to seal against the outer surface of a fuel nozzle of predetermined cross sectional dimensions. At its axially inner end, this annular body is configured to provide at least three, and preferably four gusset members which converge inwardly of the tank and meet at their inner ends to form a check valve where the axially inner ends of these gusset members meet.

In use, these gusset members seal the interior of the tank against the escape of vaporized fuel except while the tank is being filled. For that purpose, they can be spread apart to open the valve as a fuel nozzle is inserted through the annular body.

A special advantage of this seal and check valve is that the multiple gusset members, each of which includes two web portions that converge toward the axis of the body and are integrally joined together along their radially inner edges, include edge portions of substantial linear extent that define the corresponding large periphery of the opening for the nozzle, so that the material of the gussets requires relatively little displacement, with minimal stretching, for passage of the nozzle, and therefore with minimum likelihood of tearing.

Other features and advantages of the invention will be apparent from or pointed out in the course of the description hereinafter of the preferred embodiment of the invention.

BRIEF DESCRIPTION OF THE DRAWINGS

FIG. 1 is a sectional view through the filler pipe of a fuel tank equipped with a seal in accordance with the co-owned Boehmer et al U.S. Pat. No. 4,702,386;

FIG. 2 is a view similar to FIG. 1 showing the filler pipe equipped with a combined seal and check valve in accordance with the present invention;

FIG. 3 is a fragment of FIG. 2 showing a fuel nozzle inserted through the seal and check valve;

DESCRIPTION OF THE PREFERRED EMBODIMENT

Figure 4:
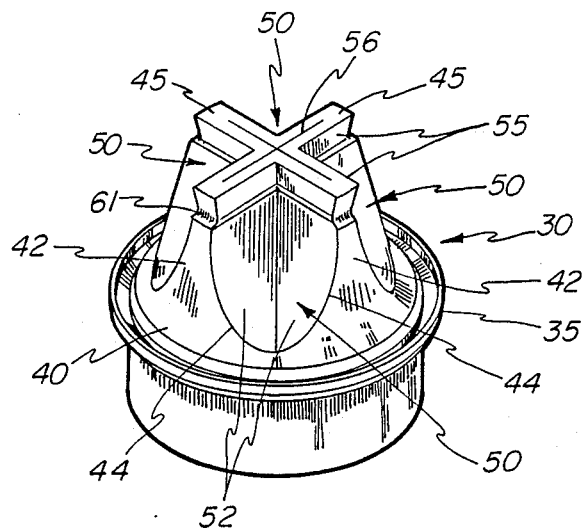
FIG. 4 is a perspective view looking at the seal and valve unit shown in FIG. 2, the view being taken with that end uppermost which is the axially inner end of the unit in use.

In FIG. 1, the filler pipe 10 of a vehicle fuel tank 11 has mounted therein a seal 12 which includes an annular lip 13 proportioned for sealing engagement with the discharge end 15 of a conventional fuel nozzle, which is understood as incorporating a manually operated valve and an automatic shut-off valve. The mounting for the seal 12 in the filler pipe 10 comprises a tubular bracket 20 fixed in the outer end of the pipe 10 and including at its axially inner end an annular flange 21 having at least one vent hole 22 therethrough which is releasably closed by the umbrella valve portion 24 of seal 12. The bracket 20 also includes a pivotal mounting 25 for a check valve 26 which closes against the seat portion 27 on the axially inner end of the seal 12.

The seal and check valve unit 30 of the invention, as shown in FIG. 2, may be mounted in the filler pipe 10, by a similar bracket 20', except that because the unit of the invention includes an integral check valve, the bracket 20' does not incorporate means for supporting a separate check valve.

The unit 30 is a one-piece annular or tubular body of fuel-resistant elastomeric material, such as neoprene and like materials. At its end which is outermost of the filler pipe in use, it is configured very similarly to the unit 12 in FIG. 1, in that it includes a circumferential groove 31 for mounting engagement with the inner periphery of the bracket flange 21. It also includes a tapered inlet end portion 32 facilitating insertion of the nozzle 15, and an annular lip 33 for sealing engagement with the nozzle while enabling the nozzle to pivot in the same manner as the nozzle end 15 as illustrated in FIG. 1.

The axially outer end portion of the body 30 includes a circumferential skirt portion 35 which forms an umbrella seal normally closing the vent 22 in flange 21, but which is sufficiently flexible to be deflected out of sealing engagement with the vent or vents 22 when the gas pressure inside the fuel tank 11 requires relief. In this respect it also is similar to the seal 12 and its umbrella valve portion 24 in FIG. 1.

It is the axially inner end portion of the body 30, namely the portion below the groove 31, which incorporates novel means defining an integral check valve. Thus just below the groove 31 is a continuous tubular portion 40, which preferably has a conical outer surface to serve as a pilot facilitating insertion of the body 30 through the bracket flange 21. From this portion 40, as best seen in FIG. 4, extend four equally spaced, finger-like fragmentary tubular portions 42 having curved side edges 44 and conically curved outer surfaces leading to narrow squared ends 45.

Figure 6:
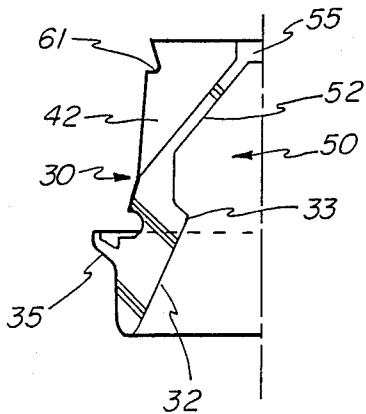
FIG. 6 is a partial view in axial section on the line 6—6 of FIG. 7.

The spaces between adjacent finger portions 42 are filled by four gusset members 50, each of which is integrally connected with the adjacent pair of curved side edges 44 on adjacent finger portions 42. Each of the gusset members 50 includes a pair of web members 52 having a major portion of essentially triangular shape and relatively thin section for correspondingly high flexibility, and these web members are integrally joined together along their radially inner edges. In addition, as best shown in FIG. 6, each of the web members includes a minor portion 55 of greater thickness along its axially inner end which forms a somewhat stiffer rim.

Figure 7:
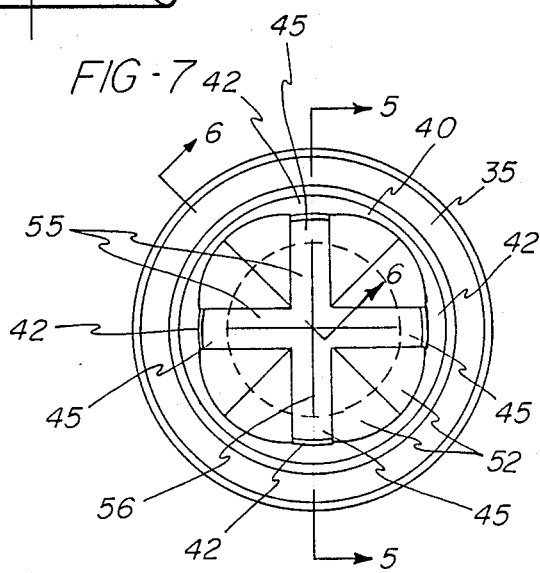
FIG. 7 is an elevational view looking from right to left in FIG. 5.

These rims 55 on each gusset member 50 are normally at right angles to each other, as shown in FIGS. 4 and 7, and they are provided with fat surfaces 56 along their radially inner sides. These parts are configured and proportioned so that the flat surfaces 56 on each gusset member 50 will meet in sealing relation with the corresponding surfaces on the adjacent gusset members to form the closed position of the check valve shown in FIGS. 4 and 7, wherein the rims 55 and the parting lines between their surfaces 56 define a right angled cross. In this closed position, any pressure within the tank, and particularly the force of liquid fuel, will act on the web portions 52 to force the rims 55 closer together.

Figure 5:
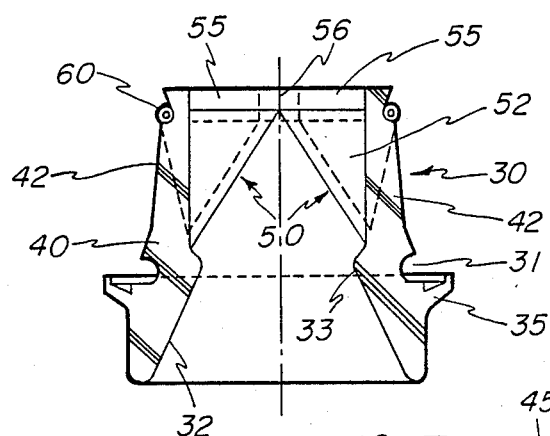
FIG. 5 is an axial section on the line 5—5 of FIG. 7.

Under most operating conditions, the configurations and natural resiliency of these parts are sufficient to hold the check valve closed. Under some conditions, however, such as in cold weather when the elastomeric material tends to be stiff, it is desirable to augment the closing force of the check valve parts. For this purpose, biasing means such as fieldable ring means in the form of an O-ring or garter spring 60 (see FIGS. 2 and 5) may be mounted on the check valve end of the body 30, in a groove 61 (see FIGS. 4 and 6) in the outer surface of each of the finger-like portions 42. This spring also augments the natural resiliency of the body 30 in biasing the web member rims 55 into sealing engagement with each other.

In use, and referring particularly to FIG. 3, the discharge end 15 of a fuel pump nozzle is inserted through the body 30 until it has forced the gusset members 50 apart and projected beyond the rim portions 55. This action of physically opening the check valve does not require excess stretching of any of its component portions, since the total sum of the lengths of the rim surfaces 56 is substantially greater than the inner circumferential dimension of sealing lip 33 and therefore than the correspondingly outer circumference of the nozzle 15. Rather, the gusset members are simply spread apart as the nozzle passes therebetween, but for each of the gusset members, the movement is relatively small and requires only that they be deflected with minimal elongation.

Further, during this entering movement, the nozzle 15 will primarily contact only the radially innermost edge portion of each gusset along which its component web members are integrally joined. In other words there will be essentially point contact between the nozzle and each gusset member, as contrasted with circumferential contact in seals such as those of the above Vest and Maeroff patents. Then when the nozzle is withdrawn, again having essentially point contact with the gusset members, these members 50 simply return to their molded shapes wherein they close the check valve as best seen in FIG. 7.

As an example of suitable dimensions for a seal and check valve in accordance with the invention for use with a standard gasoline pump nozzle, the overall length of the unit may be approximately 1.50 inches, the inner diameter of the sealing lip 33 may be 0.772 inch, and the inner diameter of the tubular portion 40 and the finger portions 42 may be 0.900 inch. The axial length of each of the fingers 42 may be 0.700 inch, and the width of the squared end of each of these portions 52 may be 0.200 inch. The thickness of the thin section of each of the web portions 52 may be 0.050 inch, while each of the rim portions of 55 may have a thickness of 0.100 inch and a radial dimension of 0.450 inch. Thus the total of the radial dimensions of the rim portions 55 will be in excess of three inches, and with these dimensions, the gusset members 50 are easily deflected out of the way of a nozzle without the possibility of stretching, tearing or other damage.

An important feature of the invention is that while the fuel tank is being filled, after insertion of the nozzle 15 through the body 30, the check valve portions of the body are not required to be in sealing engagement with the outer surface of the nozzle, as is the case with filler pipe seals of the type shown in the above Vest and Maeroff patents. Instead, the sealing of the filler pipe against free escape of evaporated fuel is provided by engagement between the nozzle 15 and the annular lip 33, which also provides for rocking of the nozzle without breaking the seal, in the manner as disclosed in the above Boehmer et al patent. Since the gusset members 50 are therefore relieved of sealing responsibility except to form a check valve when the nozzle is withdrawn, they can be made as described of proportions which minimize their deflection by the nozzle and effectively eliminate the possibility of over stretching, tearing or other damaging effects caused by insertion or withdrawal of a nozzle incident to a refueling operation.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A combination seal and check valve to be mounted in the filler pipe of a fuel tank to minimize the escape of vapor from the tank, comprising:
   (a) an annular body of elastomeric material including an axially outer end portion having a radially outer surface thereof configured for mounting in sealing engagement with an outer end of a filler pipe,
   (b) said body having a radially inner surface proportioned to receive therethrough a fuel nozzle of predetermined outer peripheral dimensions and including an annular lip proportioned for sealing engagement with said fuel nozzle,
   (c) said body having axially inner end portions defining a check valve for preventing passage of fluid through said body from a tank when no nozzle is inserted therethrough,
   (d) said check valve comprising a continuous tubular portion intermediate ends of said body, said continuous tubular portion being of an inner diameter greater than that of said lip, and at least three fragmentary tubular portions extending in uniformly circumferentially spaced relation with each other from said continuous tubular portion to an axially inner end of said body,
   (e) a gusset member interconnecting adjacent ones of said at least three fragmentary tubular portions and comprising pairs of web members extending radially inwardly of said body in converging relation from adjacent ones of said at least three fragmentary tubular portions and integrally connected with each other along radially inner edges thereof, and
   (f) said pairs of web members being proportioned and configured to engage each other along axially inner edges thereof and thereby to define a closed position of said check valve,
   (g) whereby upon insertion of a filler nozzle through said body, a discharge end of said nozzle will deflect said gusset members away from each other to provide space therebetween for said nozzle.

2. A combined seal and valve as defined in claim 1 characterized in that there are four of said gusset members, and axially inner ends of said gusset members define a right angled cross.

3. A combined seal and valve as defined in claim 2 wherein each of said web members includes a major portion of relatively thin section for increased flexibility, and a minor portion of greater thickness forming a rim at the axially inner end of said body for increased stiffness, said rims having flat surfaces on radially inner sides thereof whereby said surfaces on each said gusset member engage opposed said surfaces on adjacent said gusset members in sealing relation in said closed position of said check valve, and wherein each of said web members converge toward an axially inner end of said body to facilitate deflection thereof by an inserted nozzle.

4. A combined seal and valve as defined in claim 1 wherein radially outer surfaces of said at least three fragmentary tubular portions define a conical surface.

5. A combined seal and valve as defined in claim 1 wherein each of said web members is of essentially triangular shape, and connected radially inner edges of said pairs of web members converge toward an axially inner end of said body to facilitate deflection thereof by an inserted nozzle.

6. A combined seal and valve as defined in claim 1 further comprising yieldable ring means encircling axially inner ends of said at least three fragmentary tubular portions to bias axially inner ends of said pairs of web members into sealing engagement with each other in said closed position of said check valve.

7. A combined seal and valve as defined in claim 1 wherein each of said web members includes a major portion of relatively thin section for increased flexibility, and a minor portion of greater thickness forming a rim at an axially inner end of said body for increased stiffness, said rims having flat surfaces on radially inner sides thereof whereby surfaces on each said gusset member engage opposed surfaces on adjacent said gusset members in sealing relation in said closed position of said check valve.

* * * * *